H. F. REINECKE.
Pot for Plants.

No. 197,406. Patented Nov. 20, 1877.

Witnesses
Otto Hufeland
Hugo Brueggemann

Inventor
Henry F. Reinecke
by
Van Santvoord & Hauff
his attorneys

UNITED STATES PATENT OFFICE.

HENRY F. REINECKE, OF JERSEY CITY HEIGHTS, NEW JERSEY.

IMPROVEMENT IN POTS FOR PLANTS.

Specification forming part of Letters Patent No. 197,406, dated November 20, 1877; application filed October 5, 1877.

*To all whom it may concern:*

Be it known that I, HENRY F. REINECKE, of Jersey City Heights, in the county of Hudson and State of New Jersey, have invented a new and useful Improvement in Pots for Plants, which improvement is fully set forth in the following specification, reference being had to the accompanying drawings, in which—

Figure 1:
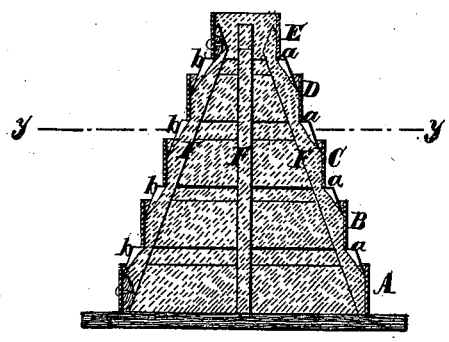
Figure 2:
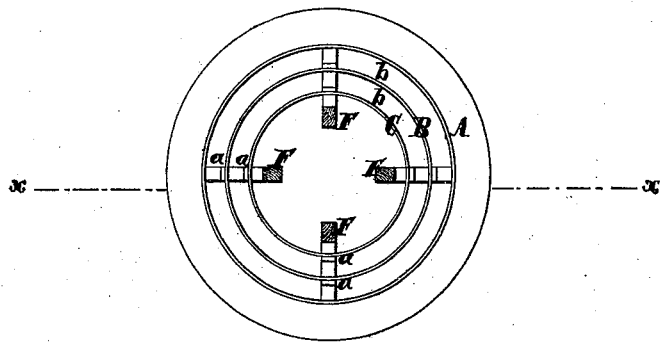

Figure 1 represents a vertical section in the plane $x$ $x$, Fig. 2. Fig. 2 represents a horizontal section in the plane $y$ $y$, Fig. 1.

Similar letters indicate corresponding parts.

This invention consists in the combination of a series of cylinders or polygons of gradually-decreasing size, and a conical frame composed of posts, which are provided with notches adapted to support the cylinders or polygons, leaving a small space between the top of each cylinder or polygon and the bottom of the succeeding one, to raise the cylinders one above the other, and to form annular spaces, in which the flowers or plants are to be planted.

In the drawings, the letters A B C, &c., designate a series of rings or polygons of sheet metal, or any other suitable material, which are of gradually-decreasing size, and which are placed one above the other on a conical frame, consisting of posts F F. These posts are provided with notches $a$, to support the cylinders or polygons. Each succeeding cylinder or polygon is made smaller than the preceding one, and a space is left between the top of each cylinder or polygon and the bottom of the following one, so as to leave annular spaces $b$ between the rings or polygons. The whole inner part of the frame and the annular spaces between the rings or polygons are filled with earth, and in these annular spaces flowers or plants are planted, which can grow straight up without hinderance, on account of the decreasing size of the cylinders. The lowest ring may be provided with a bottom or placed on the earth, as may be desired.

By means of this device a large quantity of plants can be grown in a comparatively small space.

What I claim as new, and desire to secure by Letters Patent, is—

The combination of a series of cylinders or polygons, A B C, &c., of gradually-decreasing size, and a conical frame composed of posts F F, such posts being provided with notches adapted to support the cylinders or polygons, substantially as herein shown and described.

In testimony that I claim the foregoing I have hereunto set my hand and seal this 3d day of October, 1877.

HENRY F. REINECKE. [L. S.]

Witnesses:
 W. HAUFF,
 E. F. KASTENHUBER.